US009633262B2

(12) United States Patent
Zilberstein et al.

(10) Patent No.: US 9,633,262 B2
(45) Date of Patent: Apr. 25, 2017

(54) CONTENT INTERRUPTION POINT IDENTIFICATION ACCURACY AND EFFICIENCY

(71) Applicant: Microsoft Technology Licensing, LLC, Redmond, WA (US)

(72) Inventors: Karin Zilberstein, Kirkland, WA (US); Diana Finster, Seattle, WA (US); Enrique de la Garza, Sammamish, WA (US); Alexei Pineda, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 14/550,905

(22) Filed: Nov. 21, 2014

(65) Prior Publication Data
US 2016/0148055 A1     May 26, 2016

(51) Int. Cl.
*H04N 7/10*     (2006.01)
*G06K 9/00*     (2006.01)
*G06Q 30/02*     (2012.01)
*H04N 21/233*     (2011.01)
*H04N 21/234*     (2011.01)
(Continued)

(52) U.S. Cl.
CPC ...... *G06K 9/00765* (2013.01); *G06K 9/00711* (2013.01); *G06Q 30/0241* (2013.01); *H04N 21/233* (2013.01); *H04N 21/23418* (2013.01); *H04N 21/4394* (2013.01); *H04N 21/44008* (2013.01); *H04N 21/44016* (2013.01); *H04N 21/458* (2013.01); *H04N 21/812* (2013.01); *H04N 21/84* (2013.01); *H04N 21/8455* (2013.01); *G06K 2009/00738* (2013.01); *H04N 21/2668* (2013.01); *H04N 21/44218* (2013.01)

(58) Field of Classification Search
CPC .................. H04N 21/44218; H04N 21/2668
USPC ............................................. 725/12, 36, 34
See application file for complete search history.

(56) References Cited

U.S. PATENT DOCUMENTS

| 8,111,759 B2* | 2/2012 | Winter | G11B 27/005 375/240.28 |
| 8,225,194 B2* | 7/2012 | Rechsteiner | G11B 27/034 707/805 |

(Continued)

*Primary Examiner* — Pankaj Kumar
*Assistant Examiner* — Sahar Baig
(74) *Attorney, Agent, or Firm* — The Watson IP Group, PLC; Vladan M. Vasiljevic

(57) ABSTRACT

Automated content interruption point identification improves the accuracy with which potential content interruption points are identified, and increases the efficiency of content interruption point identification and content distribution. Potential interruption points are automatically identified based on transitions occurring within the content, including changes in the sound level, changes in the light, or brightness, level, changes in people visible in a scene of the content, transitions that are identified by content metadata, and other types of transitions. In providing content to a content consumer, a determination is made whether to interrupt the provision of the content, at one or more of the identified potential content interruption points, based on factors including interruption point metadata, metadata associated with auxiliary content that would be inserted, and user information, which includes explicitly specified user settings, as well as detected user information.

20 Claims, 5 Drawing Sheets

(51) Int. Cl.
*H04N 21/439* (2011.01)
*H04N 21/44* (2011.01)
*H04N 21/458* (2011.01)
*H04N 21/81* (2011.01)
*H04N 21/84* (2011.01)
*H04N 21/845* (2011.01)
*H04N 21/2668* (2011.01)
*H04N 21/442* (2011.01)

(56) References Cited

U.S. PATENT DOCUMENTS

| | | |
|---|---|---|
| 8,850,471 B2 | 9/2014 | Kilar et al. |
| 2006/0078292 A1* | 4/2006 | Huang ............... G11B 27/034 386/343 |
| 2006/0080591 A1* | 4/2006 | Huang ............ G11B 20/00007 715/204 |
| 2007/0033634 A1* | 2/2007 | Leurs .................... H04N 7/163 725/143 |
| 2007/0101359 A1 | 5/2007 | Schiller et al. |
| 2008/0034386 A1 | 2/2008 | Cherry et al. |
| 2009/0055268 A1 | 2/2009 | Knoller et al. |
| 2009/0290645 A1* | 11/2009 | Mabey ............... H04N 5/23203 375/240.25 |
| 2009/0327856 A1* | 12/2009 | Mouilleseaux ... G06F 17/30781 715/230 |
| 2010/0175079 A1 | 7/2010 | Braun et al. |
| 2010/0220974 A1* | 9/2010 | Yamashita ........... G11B 27/005 386/344 |
| 2013/0111519 A1 | 5/2013 | Rice et al. |
| 2013/0132997 A1 | 5/2013 | King et al. |
| 2013/0211925 A1 | 8/2013 | Holland |
| 2013/0276026 A1 | 10/2013 | Sherwin et al. |
| 2014/0136336 A1 | 5/2014 | Mak et al. |
| 2014/0139742 A1 | 5/2014 | Krishna et al. |
| 2014/0304597 A1* | 10/2014 | Einstein ............ H04N 21/2353 715/716 |
| 2016/0227277 A1* | 8/2016 | Schlesinger ..... H04N 21/44218 |

\* cited by examiner

CONTENT INTERRUPTION POINT IDENTIFICATION ACCURACY AND EFFICIENCY

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon.

Utilizing advertising revenue to decrease the cost of content to individual consumers of such content enables content distributors to reach a broader audience. More specifically, content consumers that are averse to advertising can obtain content through the purchase thereof, where the purchase price paid by such consumers can be increased to reflect the lack of any advertising revenue being utilized to offset the cost of the content. At an opposite end of the spectrum can be content consumers that are agnostic to, or even desirous of, advertising. Such content consumers can be provided the content for free, with the cost of the content being, instead, offset by the advertising revenue. In between those two ends of the spectrum, the cost of content, to consumers of such content, can be reduced in varying degrees by advertising provided with such content, where the advertising revenue received from such advertising offsets the reduced cost, to the content consumer, of the content. Consequently, content distributors can profitably distribute content to a broad range of content consumers, including content consumers that are willing to purchase content at an increased price to avoid advertising, and content consumers that are desirous of purchasing content at a reduced price, or even free, in exchange for consuming advertising provided with such content.

Traditionally, advertisements are inserted into content through manual processes, whereby one or more humans, utilizing human decision-making, select where to insert such advertisements into the content. The manual processing of content to select where such content can be interrupted, such as for advertisements, is inefficient and requires a substantial investment of human resources. Furthermore, such manual processing is inflexible, with each identified interruption point being utilized in the subsequent presentation of such content.

SUMMARY

Automated content interruption point identification improves the accuracy with which potential content interruption points are identified, and increases the efficiency, both of content interruption point identification in particular, and, more generally, of content distribution. As to the latter, interruption points identify where consumption of the primary content can be interrupted and, instead different, auxiliary content can be presented users. The provision of auxiliary content has advantages to users, including reducing the cost of the primary content and providing the users with impactful information. Different users have different tolerances or desires for auxiliary content, and, as such, the distribution of primary content is made more efficient through automated content interruption point identification because automatically identified content interruption points enable the dynamic selection of when and how often the primary content is interrupted. Potential interruption points can be automatically identified in content based on transitions occurring within the content including changes in the sound level of the content, changes in the light, or brightness, level of the content, changes in people visible in a scene of the content, transitions that are identified by content metadata, such as explicit scene terminations, and other types of transitions. In providing content to a consumer, a determination can be made whether to interrupt the provision of the content at one or more of the identified potential content interruption points. Such a determination can be based on factors including metadata detailing why such a point in the content was identified as a potential content interruption point, metadata associated with auxiliary content that would be inserted and presented while the primary content was interrupted, and user information, which can include explicitly specified user settings or preferences, as well as detected user information. The automated identification of potential content interruption points can be applied both to content lacking any pre-existing content interruption points, as well as to content already having predefined content interruption points.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
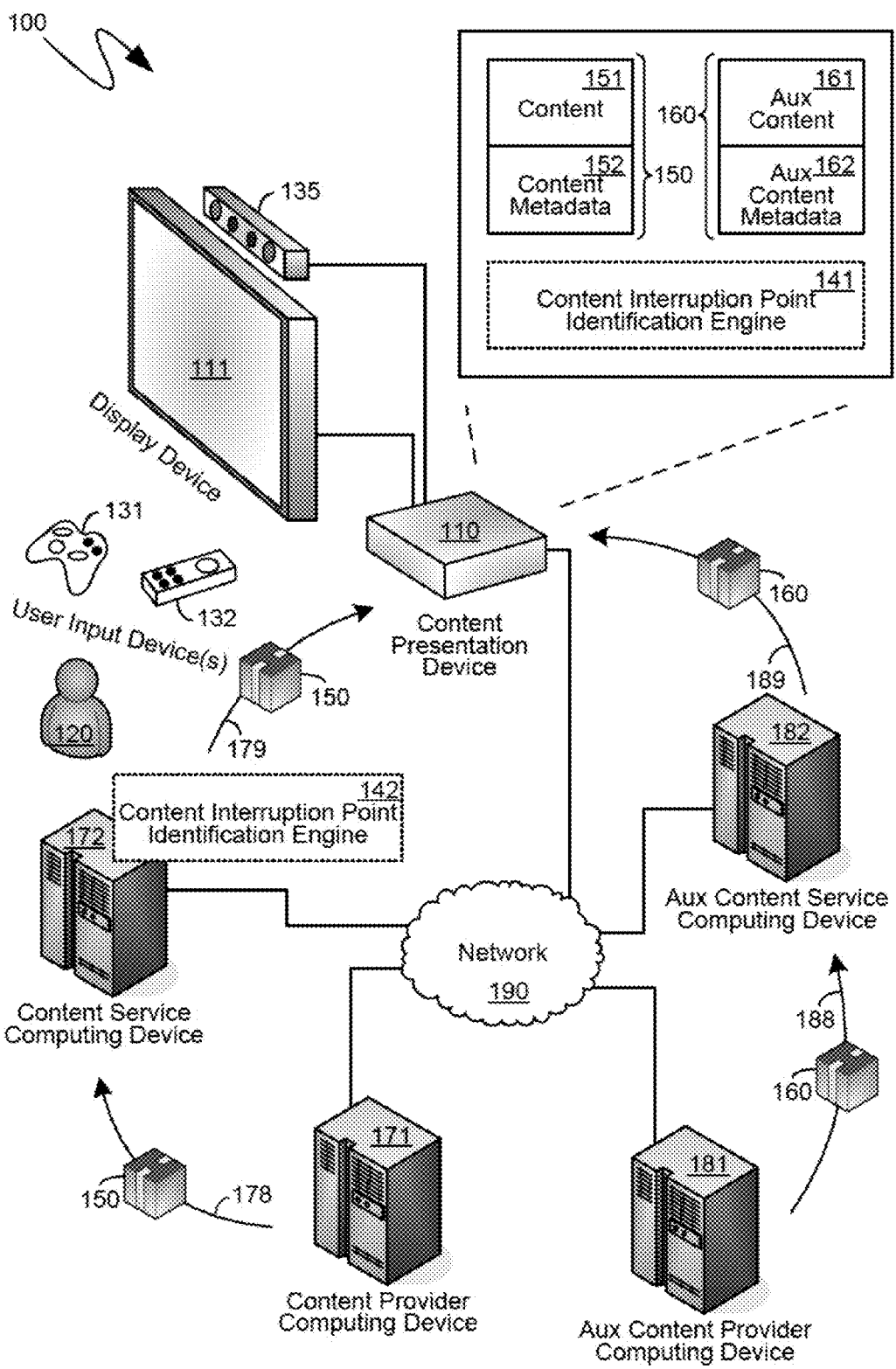
FIG. 1 is a block diagram of an exemplary system providing more accurate and efficient identification of potential interruption points in content.

The following description relates to mechanisms for improving both the efficiency and the accuracy with which potential interruption points in content are first identified, and then subsequently utilized during the presentation of such content. More specifically, automated content interruption point identification improves the accuracy with which potential content interruption points are identified. Additionally, automated content interruption point identification increases the efficiency, both of content interruption point identification in particular, and, more generally, of content distribution. As to the latter, interruption points identify where consumption of the primary content can be interrupted and, instead different, auxiliary content can be presented users. The provision of auxiliary content has advantages to users, including reducing the cost of the primary content and providing the users with impactful information. Different users have different tolerances or desires for auxiliary content, and, as such, the distribution of primary content is made more efficient through automated content interruption point identification because automatically identified content interruption points enable the dynamic selection of when and how often the primary content is interrupted. Such dynamic personalization of primary content interruption, and auxiliary content presentation, further drives user engagement and increases user interaction performance. Potential interruption points can be automatically identified in content based on transitions occurring within the content including changes in the sound level of the content, changes in the light, or brightness, level of the content, changes in people visible in a scene of the content, transitions that are identified by content metadata, and other types of transitions. In providing content to a content consumer, a determination can be made whether to interrupt the provision of the content at one or more of the identified potential content interruption points. Such a determination can be based on factors including metadata detailing why such a point in the content was identified as a potential content interruption point, metadata associated with auxiliary content that would be inserted and presented while the primary content was interrupted, and user information, which can include explicitly specified user settings or preferences, as well as detected user information. The automated identification of potential content interruption points can be applied both to content lacking any pre-existing content interruption points, as well as to content already having predefined content interruption points.

The techniques described herein can be utilized to present advertising within the context of the presentation of advertising-sponsored content. Within such a context, the advertising-sponsored content can be content that the user wishes to consume, such as television shows, movies, video games, applications and other content. As a condition of consuming such content at a particular cost, which is typically a reduced cost, or free, the user can be presented with advertisements. However, the descriptions provided herein that reference advertising are not meant to suggest limitation of the described techniques to only such utilizations. For example, the described techniques are equally applicable to contexts where the auxiliary content includes content directed to explicitly or implicitly determined user interests, user favorites, frequently consumed content and the like. Indeed, the described techniques are equally applicable to any environment in which auxiliary content is to be presented to one or more users that are otherwise consuming primary content.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other devices capable of executing the computer-executable instructions in the manner intended to produce the desired results, including handheld devices, multi-processor systems, microprocessor based or programmable consumer electronics, network PCs, minicomputers, mainframe computers, video game consoles, digital video recorders, audio and/or video content presentation devices and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and other like hardware logic components and devices.

Turning to FIG. 1, an exemplary system 100 is illustrated, providing context for the descriptions below. As illustrated in FIG. 1, the exemplary system 100 can comprise a content presentation device 110 that can be communicationally coupled to a physical display device 111. The physical display device 111 can be any type of display device that can generate a viewable physical image, including Liquid Crystal Display (LCD) devices, plasma-based devices, Organic Light Emitting Diode (OLED) devices, phosphorus-based devices, and other like display devices. As will be recognized by those skilled in the art, such display devices generate images through the manipulation of discrete, physical elements that, in aggregate, comprise the image being presented by the display device. For example, an LCD-based device generates images through the physical orientation of individual, physical liquid crystals, which, in aggregate, form the image being presented by the LCD-based device.

The content presentation device 110 can be any device having sufficient processing capability to execute the computer-executable instructions, and perform the steps, described herein. For example, the content presentation device 110 can be a video game console, a digital video recorder, a set-top box provided by a content, or network, provider, or any of the above-enumerated computing devices. The content presentation device 110 can further comprise sufficient hardware and software capability to control a display device, such as the display device 111, in order to cause the display device 111 to generate images thereon. One or more users, such as the user 120, can utilize the content presentation device 110 to consume content displayed by the content presentation device 110 via the physical display device 111. The user 120 can interface with the content presentation device 110 through various user input devices including, for example, a conventional remote control 132, a video game controller 131, an audio/visual input device 135, as well as more traditional computer input devices, such as a trackpad, a mouse, keyboard, and other like user input devices. As will be recognized by those skilled in the art, the audio/visual input device 135 can comprise sensors by which the physical appearance and physical movements of the user, as well as audio generated by the user, can be utilized to provide user input, such as to the content presentation device 110.

In certain instances, the content presented by the content presentation device 110 can include advertising-supported content. Such advertising-supported content can include television shows, movies, video games, and other like advertising-supported content. Typically, such advertising-supported content will have defined periods of time, defined instances, or defined circumstances during which advertisements can be presented. Such advertisement-presentation constructs are typically referred to as "ad breaks". As indicated previously, interruptions in advertising-supported content, during which advertisements can be displayed, are predefined by manual processes in which one or more humans view the advertising-supported content and determine appropriate instances, or points within the content, where the advertising supported content can be interrupted in order to insert advertising. In some instances, the advertising-supported content can be specifically created to accommodate interruptions, such as for the presentation of advertising. For example, television shows can be created and designed so as to comprise defined scenes, between which can be inserted ad breaks. In other instances, the advertising-supported content can, initially, have been created to be presented in an interruption-free manner. For example, movies can be filmed and edited so as to be presented in an uninterrupted manner. Consequently, when such movies are presented within an advertising-supported context, advertisements are shown during ad breaks that interrupt the presentation of the movie at specific points. As indicated previously, those points are identified by humans evaluating the movie content and determining appropriate points within such content when an interruption can occur. As has also been indicated previously, identifying interruption points within content can be an inefficient task, as it is not currently automated and, instead, relies upon heuristic human evaluation.

The content presentation device 110 can be communicationally coupled with a network 190, through which the content presentation device 110 can obtain content to display to its users, including the aforementioned advertising-supported content. Also communicationally coupled to the network 190 can be a content service from which the content presentation device 110 can receive primary content. For example, such a content service can be an online component of a network television channel, an online movie rental service, an online gaming delivery system, or another service from which user desired content can be obtained by the user 120 utilizing the content presentation device 110. Such a content service can comprise one or more content service computing devices, such as exemplary content service computing device 172.

According to one aspect, the content service can obtain content to offer to the user 120, such as via the content presentation device 110, from a content provider. Such a content provider can include an originator or author of the content, such as a movie or television studio, or a game developer, a distributor of the content, such as a production company or other like distributors, or other content source. The content provider can comprise one or more content provider computing devices, such as the exemplary content provider computing device 171, which can also be communicationally coupled to the network 190. Such a content provider computing device 171 can transmit a content package 150, comprising the content 151, as well as content metadata 152, which will be described in further detail below, to a content service computing device, such as exemplary content service computing device 172, as illustrated by the communication 178. Subsequently, such as in response to either implicit or explicit user action in interacting with the content presentation device 110, the content service computing device 172 can transmit the content package 150 to the content presentation device 110 via the network 190, as illustrated by the communication 179.

Also communicationally coupled to the network 190 can be an advertisement service, or a service that otherwise provides auxiliary content that is different from primary content that can be received by the content presentation device 110, such as from the content service computing device 172 in the manner detailed above. Such an auxiliary content service can be comprised of one or more auxiliary content service computing devices, such as the exemplary auxiliary content service computing device 182 shown in FIG. 1. The auxiliary content service can receive information, including information from the content presentation device 110, and can select auxiliary content to be displayed by the content presentation device 110, on the physical display device 111, as part of the presentation of content, such as advertising-supported content. Auxiliary content, such as advertisements, are often selected, by the auxiliary content service, based upon information regarding the audience to which such auxiliary content will be presented. For example, auxiliary content can be selected based upon the type of primary content with which such auxiliary content will be presented.

According to one aspect, an auxiliary content service can receive varying different auxiliary content from one or more auxiliary content providers. Such auxiliary content providers can, each, be comprised of one or more auxiliary content provider computing devices, such as exemplary auxiliary content provider computing device 181, which can also be communicationally coupled with the network 190. Within the context of advertising, an auxiliary content provider can be an individual advertiser or advertising agency, which can provide advertisements to an advertisement service, such as the auxiliary content service detailed above. For example, an auxiliary content provider, can provide an auxiliary content package 160, comprising the auxiliary content 161 and auxiliary content metadata 162, which will be described in detail below, to an auxiliary content service. For example, exemplary system 100 of FIG. 1 illustrates such an auxiliary content package 160 being communicated from the exemplary auxiliary content provider computing device 181 to the exemplary auxiliary content service computing device 182, via the communication 188. Subsequently, such as based on various factors, including those indicated above, the auxiliary content service can select one or more of the auxiliary content, which it has received, to be provided to the content presentation device 110, where at least some of such auxiliary content can, ultimately, be displayed to the user, such as exemplary user 120, via the display device 111 that is communicationally coupled to the content presentation device 110. The communication of auxiliary content, such as the exemplary auxiliary content package 160, from an auxiliary content service to the content presentation device 110 is exemplarily illustrated by the communication 189 in FIG. 1.

The content presentation device 110 can have executing thereon a content presentation application that can display content on the display device 111. For example, the content presentation application can be a video player application, a video game, or other like content presentation application. The content presentation application can, if the user 120 has so authorized, collect information regarding the user 120 and the content presentation device 110. Such information can then be provided, by the content presentation application, to, for example, the auxiliary content service, thereby enabling the auxiliary content service to provide auxiliary content that is targeted to, or more relevant to, the user 120. Alternatively, such information can be utilized, such as by the content presentation application, to select appropriate ones of auxiliary content that can already be available to the content presentation device 110, such as, for example, auxiliary content that can have already been provided to the content presentation device 110, such as by the auxiliary content service computing device 182.

To identify interruption points at which the primary content can be interrupted to accommodate the display of auxiliary content, such as advertisements, a content interruption point identification engine can be executed, either on the content presentation device 110, in the form of the content interruption point identification engine 141, the content service computing device 172, in the form of the content interruption point identification engine 142, or combinations thereof. More specifically, and as indicated previously, existing mechanisms by which interruption points are identified can be costly and time-consuming because such mechanisms rely on human judgment to identify the interruption points. According to one aspect, therefore, content interruption points, at which the primary content can be interrupted to accommodate the display of auxiliary content, can be automatically identified by a content interruption point identification engine, such as exemplary content interruption point identification engine 141, executing on the content presentation device 110, the exemplary content interruption point identification engine 142, executing on the exemplary content service computing device 172, or combinations thereof.

Figure 2:
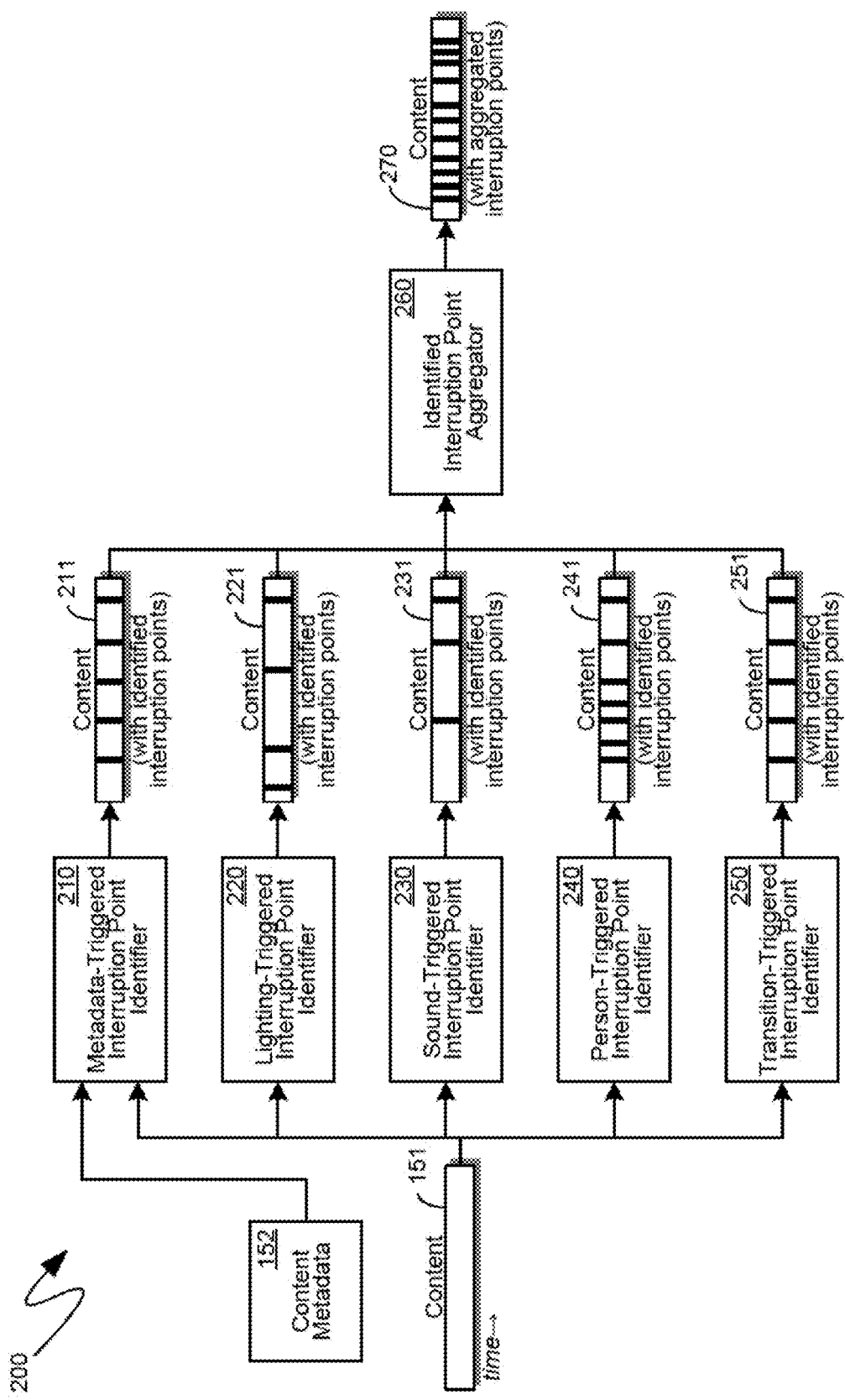
FIG. 2 is a block diagram of exemplary mechanisms for providing more accurate and efficient identification of potential interruption points in content.

Turning to FIG. 2, the exemplary system 200 shown therein illustrates an exemplary operation of a content interruption point identification engine, such as the exemplary content interruption point identification engines illustrated in FIG. 1. Initially, content, such as exemplary content 151, and corresponding content metadata 152, can be received by a content interruption point identification engine. The content interruption point identification engine can comprise various components that can evaluate aspects of the content 151, and, based on such evaluation, can identify potential interruption points within the content. More specifically, the content interruption point identification engine can comprise various components in the form of collections of computer-executable instructions that can be executed in series or in parallel on one or more computing devices. The execution of the computer-executable instructions that manifest the components, described below, causes the processing units and other components of the computing device on which such components are instantiated, to perform the steps and methods described. Additionally, as utilized herein the term "point" refers to a specific instant in time, or a specific set of circumstances, within the context of the playback content. Thus, for example, a "point" in a television show, movie, or other like content designed to be played back linearly, can be a specific instance in time, typically defined by an elapsed duration of the playback of the content, from the beginning of the content, until such a point. As another example, a "point" in a videogame, or other like content designs to be consumed nonlinearly, can be a specific set of circumstances that can be defined within the context of the content, such as based on a specific accomplishment, by the user playing such a game, within the context of the game.

One component of a content interruption point identification engine can be a metadata-triggered interruption point identifier, such as the exemplary metadata-triggered interruption point identifier 210. According to one aspect, content metadata, such as exemplary content metadata 152, can comprise information about the content that can be utilized to identify interruption points. For example, the content metadata 152 can specify interruption points for which the content has been specifically created or edited. As indicated previously, television shows, for example, can comprise defined scenes, and the completion of a defined scene can be identified, such as via the content metadata 152. As another example, the content metadata 152 can specify previously identified interruption points, such as by a human evaluation. For example, when movies are released on optical disk, they are often divided into chapters to facilitate the user's consumption of such movies. As indicated previously, movies are typically designed to be consumed without interruption and, consequently, the division of a movie into chapters, such as for an optical disc release, can be performed by human evaluation. In such an example, content metadata 152 can specify the chapter transitions, and other like information.

Content metadata, such as the exemplary content metadata 152, can comprise other information that can be utilized to identify potential content interruption points. For example, the content metadata 152 can comprise information regarding the overall duration of the content, various goals or accomplishments that can be achieved within the context of the content, such as if the content is a videogame, information regarding the volume of the content, the brightness of the content, and other like attributes of the content, and other like metadata.

A metadata-triggered interruption point identifier, therefore, such as the exemplary metadata-triggered interruption point identifier 210, can parse such content metadata 152 and derive therefrom content interruption points. More specifically, the exemplary content 151 can be annotated, by the exemplary metadata-triggered interruption point identifier 210, to generate the annotated content 211 comprising indicators of the identified interruption points such that, upon playback of the annotated content 211, the playback can cease at one or more of the identified interruption points, and alternative, auxiliary content can, instead, be presented to the user. To generate the annotated content 211, the exemplary metadata-triggered interruption point identifier 210 can annotate, as a potential interruption point, one or more chapter transitions identified in the content metadata 152, one or more scene transitions identified in the content metadata 152, and other like potential interruption points. Additionally, according to one aspect, the potential interruption points that are annotated by the exemplary metadata-triggered interruption point identifier 210 can further comprise interruption point metadata that can identify why such interruption points were identified as potential interruption points. As will be described in further detail below, during playback of such annotated content, determinations can be made, such as based on the annotated interruption point metadata, as to whether such an interruption point is to be utilized to actually interrupt playback of the annotated content and, instead, provide the user with auxiliary content.

Another component of a content interruption point identification engine can be a lighting-triggered interruption point identifier, such as the exemplary lighting-triggered interruption point identifier 220, shown in FIG. 2. According to one aspect, the exemplary lighting-triggered interruption point identifier 220 can receive the exemplary content 151 and can analyze exemplary content 151 to identify variances in the lighting, brightness, contrast, or other like visual aspects of the exemplary content 151. By way of an illustrative example, one scene in a television show, movie, videogame, or other like content, can take place at night such that the characters, action, and other aspects of the content occur at night, within the context of the content. A subsequent scene can then, in the present, illustrative example, take place outside during the day such that the characters, action, and other aspects of the content occur outside, in daylight, within the context of the content. A transition between two scenes, such as the two scenes described in the illustrative example above, can be selected by the exemplary lighting-triggered interruption point identifier 220 as a potential interruption point. More specifically, the exemplary lighting-triggered interruption point identifier 220 can identify potential interruption points by identifying transitions between scenes based on changes in the lighting, brightness, contrast, or other like visual aspects of the content.

One mechanism that can be utilized by the exemplary lighting-triggered interruption point identifier 220 can be to compare color histograms of various frames, or other like discrete quanta of the exemplary content 151. As will be recognized by those skilled in the art, a color histogram of a frame depicting an outside scene in daylight will be skewed towards brighter colors, while a color histogram of the frame depicting a nighttime scene will be skewed towards darker colors. An abrupt change between two such color histograms can be detected by the exemplary lighting-triggered interruption point identifier 220 and utilized to identify potential content interruption points.

Another mechanism that can be utilized by the exemplary lighting-triggered interruption point identifier 220 can be to compare an overall brightness of various frames, or other like discrete quanta of the exemplary content 151. A still other mechanism that can be utilized by the exemplary lighting-triggered interruption point identifier 220 can be to compare the presence of specific colors, or the quantity of specific colors, as among multiple different frames, or other like discrete quanta of the exemplary content 151.

As with the exemplary metadata-triggered interruption point identifier 210, the exemplary lighting-triggered interruption point identifier 220 can generate an annotated content 221, from the exemplary content 151, annotating specific potential content interruption points that were identified by the exemplary lighting-triggered interruption point identifier 220. Also as before, such annotated potential content interruption points can comprise interruption point metadata that can identify information about such potential content interruption points, such as, for example, information indicative of why those points of the exemplary content 151 were identified as potential content interruption points. For example, the potential content interruption points that were annotated in the annotated content 221 by the exemplary lighting-triggered interruption point identifier 220 can comprise content interruption point metadata indicating that such potential content interruption points represent perceived transitions between scenes having differing brightness, contrast, colorimetric profiles, or other like visual properties.

Yet another component of a content interruption point identification engine can be a sound-triggered interruption point identifier, such as the exemplary sound-triggered interruption point identifier 230 shown in FIG. 2. Like the exemplary lighting-triggered interruption point identifier 220, the exemplary sound-triggered interruption point identifier 230 can seek to identify transitions between scenes, or other transitions that can be indicative of points within the exemplary content 151 where the exemplary content 151 can be interrupted. In the case of the exemplary sound-triggered interruption point identifier 230, transitions can be identified based on changes in sound generated as part of the exemplary content 151. By way of a specific example, a movie can have a car chase scene during which energetic symphonic music can be interspersed with the sounds of squealing tires, crashes, explosions, gunfire, and other like loud sounds. A subsequent scene of the movie, in the specific, illustrative example, can be a scene in a hospital, comprising no background music and only quiet noises, such as the sounds of a quiet conversation among the people in a hospital room. In such a specific example, an analysis of the sounds between the two scenes can identify that a transition between scenes took place. For example, the exemplary sound-triggered interruption point identifier 230 can generate an audio frequency histogram for various portions of the content 151. In the above specific, illustrative example, such an audio frequency histogram can comprise higher, or more intensive values across a greater breadth of frequencies for the car chase scene than for the hospital scene. Consequently, based on an analysis of such audio frequency histograms, the exemplary sound-triggered interruption point identifier 230 can identify the transition between the car chase scene and the hospital scene, in the above specific example, or, more generally, between any two scenes having sufficient differences in sound.

Other mechanisms that can be utilized by the exemplary sound-triggered interruption point identifier 230 to identify transitions between scenes can include an analysis of the presence of, and the magnitude of the sounds in, specific frequencies or frequency ranges. For example, as will be recognized by those skilled in the art, human speech falls within a defined, relatively narrow frequency range, such as between 150 Hz and 4000 Hz, while music, such as background soundtracks, can have a far greater frequency range. Consequently, one mechanism that can be utilized by the exemplary sound-triggered interruption point identifier 230 to identify transitions between scenes can include an evaluation of the sound levels within frequency ranges coincident with human speech as compared with sound levels across broader frequency ranges. Other like audio-based analysis can likewise be undertaken by the exemplary sound-triggered interruption point identifier 230 to identify potential content interruption points.

The exemplary sound-triggered interruption point identifier 230 can generate an annotated content 231, from the exemplary content 151, with the annotated content 231 comprising annotations at the potential content interruption points identified by the exemplary sound-triggered interruption point identifier 230, together with interruption point metadata which can, like the interruption point metadata described in detail above, provide information indicative of why the interruption point was identified as a potential content interruption. More specifically, within the context of the exemplary sound-triggered interruption point identifier 230, the interruption point metadata can be indicative of transitions in the sound being generated by the exemplary content 151.

Yet another component of a content interruption point identification engine can be a person-triggered interruption point identifier, such as the exemplary person-triggered interruption point identifier 240 shown in FIG. 2. More specifically, the person-triggered interruption point identifier 240 can apply facial recognition mechanisms, or other like image analysis, to the images generated as part of the exemplary content 151 so as to identify potential content interruption points. For example, the exemplary person-triggered interruption point identifier 240 can apply facial recognition to identify various characters within a scene, such as a videogame level or location within the context of the videogame. Should the exemplary person-triggered interruption point identifier 240 no longer be able to identify those same characters, a determination can be made that a scene changed, and such a determination can trigger the identification of a potential content interruption point. For example, within the context of an adventure videogame, a user playing a character within the context of such a videogame can enter a tavern in order to interact with other videogame characters. Subsequently, the user can cause their character to leave the tavern and embark on a solo adventure, for example. In such a specific, illustrative example, the exemplary person-triggered interruption point identifier 240 can have identified the faces of various individuals in the tavern, but can identify no faces once the user causes their character to leave the tavern. Consequently, in such a specific, illustrative example, the exemplary person-triggered interruption point identifier 240 can detect such a change and can identify the user's character's departure from the tavern as a potential content interruption point. As another example, the exemplary person-triggered interruption point identifier 240 can have detected the change in a quantity of identifiable faces when the user's character first entered the tavern, such as coming in from a prior solo adventure, and can have identified such a point within the exemplary content 151 as another potential content interruption point.

Other mechanisms that can be utilized by the exemplary person-triggered interruption point identifier 240 can include recognition of specific faces, such as of specific characters, in order to detect their presence or absence in a scene. Thus, for example, a potential content interruption point can be identified, by the exemplary person-triggered interruption point identifier 240, based on a main character, for example, entering or leaving a room within the context of the exemplary content 151. Yet other mechanisms that can be utilized by the exemplary person-triggered interruption point identifier 240 can include sound-based or aural-based detection of individuals, such as based on the timbre, pitch, or other like identifiable sound characteristics of one or more characters' voices within the context of the exemplary content 151.

As with the components described in detail previously, the exemplary person-triggered interruption point identifier 240 can generate an annotated content, namely the annotated content 241, identifying potential content interruption points in the exemplary content 151, and, as with the components described in detail previously, such annotations can, optionally, include interruption point metadata that can, among other information, provide an indication of why such points, in the exemplary content 151, were identified as potential content interruption points. More specifically, within the context of the exemplary person-triggered interruption point identifier 240, such interruption point metadata can indicate that the annotated points within the annotated content 241 were identified as potential content interruption points based on changes in a quantity of identified faces, changes in a quantity of identified characters, or the presence or absence of specific characters within the context of the exemplary content 151.

Other mechanisms, that can be part of an exemplary content interruption point identification engine, can, likewise, seek to identify potential content interruption points based on detected transitions within the context of the content, such as exemplary content 151. To encompass such other mechanisms, an exemplary transition-triggered interruption point identifier 250 is illustrated in the exemplary system 200 of FIG. 2. The exemplary transition-triggered interruption point identifier 250 can identify potential content interruption points, within the exemplary content 151, based upon other detectable transitions including, for example, differences in the static or dynamic nature of scenes, which can be detected by, for example, determining how compressible the audio and image data of the scene is utilizing known compression techniques that can more effectively compress static scenes as compared with dynamic scenes. As another example, the exemplary transition-triggered interruption point identifier 250 can identify potential content interruption points based upon the presence of specific factors such as, for example, one or more frames of the exemplary content 151 that are either all black, or all white. Other like transitions can, likewise, be detected by the exemplary transition-triggered interruption point identifier 250.

Subsequently, the exemplary transition-triggered interruption point identifier 250 can generate an annotated content 251, such as exemplary content 151, with potential content interruption points identified therein based on the transitions detected by the exemplary transition-triggered interruption point identifier 250. As before, such identified potential content interruption points can, optionally, include interruption point metadata identifying why such points within the exemplary content 151 were identified as potential content interruption points.

According to one aspect, an identified interruption point aggregator, such as exemplary identified interruption point aggregator 260, can aggregate the interruption points identified by one or more of the components described in detail above, and can generate an annotated content 270 that can comprise potential content interruption points identified by one or more of the components 210, 220, 230, 240 and 250. The aggregation of the identified content interruption points, such as by the exemplary identified interruption point aggregator 260, can be a complete aggregation, with each content point, identified in one or more of the annotated content 211, 221, 231, 241 and 251, being represented in the annotated content 270.

Alternatively, the exemplary identified interruption point aggregator 260 can seek to identify potential content interruption points, from among the one or more of the annotated content 211, 221, 231, 241 and 251 being aggregated, that are being triggered by the same event within the context of the exemplary content 151. By way of an illustrative example, if the exemplary content 151 comprises a car chase scene at night, followed by a daytime hospital scene, the exemplary lighting-triggered interruption point identifier 220 can have identified a potential interruption point based on the differences in lighting between the two scenes. The exemplary sound-triggered interruption point identifier 230 can have identified a potential interruption point based on the difference in sound between the two scenes, and one or more other of the components 210, 240 and 250 can, likewise, have identified the transition between the above exemplary scenes as potential content interruption. In such an example, the exemplary identified interruption point aggregator 260 can identify two or more potential content interruption points that are less than the threshold amount of time apart from one another, or which otherwise seem to be triggering off of a single scene change, or other like transition within the exemplary content 151.

Upon identifying such two or more potential content interruption points, the exemplary identified interruption point aggregator 260 can compare interruption point metadata among the two or more potential content interruption points to identify if the two or more potential content interruption points are, in fact, triggering off of a single transition, such as a single scene change. Such a determination can be made by, for example, verifying that the two or more potential content interruption points were identified as potential content interruption points based on different criteria such as, for example, transitions in lighting, transitions in sound, and the like. Such different criteria can be indicative of independently identified potential content interruption points triggering off of a single transition. In such an instance, the exemplary identified interruption point aggregator 260 can combine those two or more potential content interruption points into a single content interruption point. Optionally, in combining such two or more potential content interruption points into a single content interruption point, the exemplary identified interruption point aggregator 260 can also combine the interruption point metadata of the two or more potential content interruption points that have been combined into a single content interruption point such that the interruption point metadata of that single content interruption point identifies each of the multiple reasons why such a point was identified as a potential interruption.

Once the exemplary identified interruption point aggregator 260 has completed aggregation of the potential interruption points identified by two or more of the components 210, 220, 230, 240 and 250, it can generate an annotated content 270 comprising multiple potential content interruption points.

Figure 3:
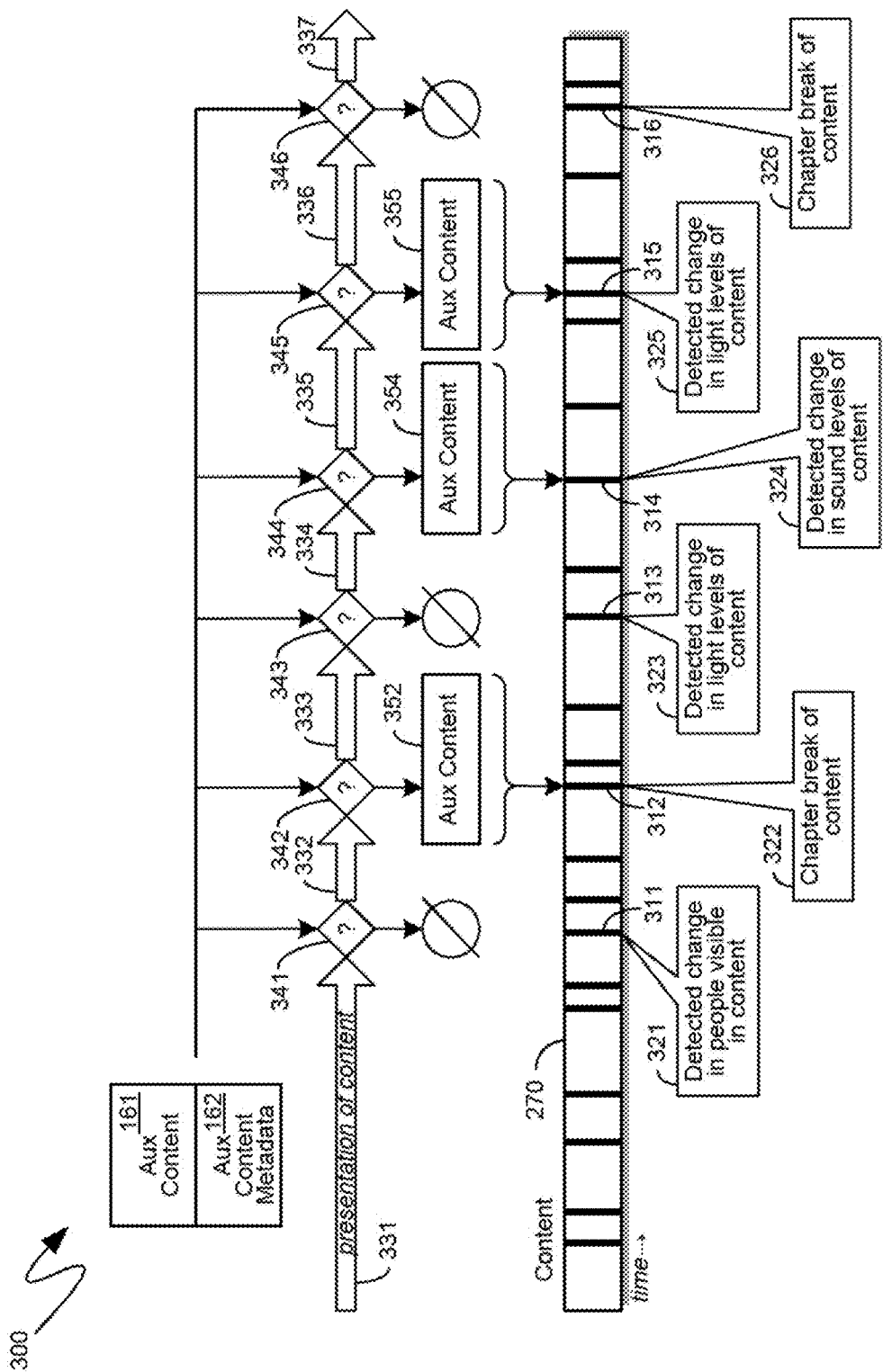
FIG. 3 is a block diagram of an exemplary provision of content to a content consumer while utilizing identified potential content interruption points to interrupt the presentation of the content in order to present auxiliary content.

Turning to FIG. 3, the exemplary system 300 shown therein illustrates an exemplary utilization of an annotated content, such as the exemplary annotated content 270, whose derivation was described in detail above, to interrupt the user's consumption of the exemplary annotated content 270 so as to insert auxiliary content, which can, as indicated previously, include advertising content. The exemplary annotated content 270 is illustrated in FIG. 3 in a rectangular form stretching from left to right across the figure to represent the consumption or presentation of such exemplary annotated content 270 over a period of time commencing with the beginning of the content and ending with the ending of the content in a conventional left-to-right illustration. Likewise, the presentation of the content is illustrated by arrows, such as exemplary arrow 331, again proceeding in a conventional left-to-right illustrative manner.

Initially, as represented by the exemplary arrow 331, the exemplary annotated content 270 can be presented to a user, or other consumer of such content. According to one aspect, the exemplary annotated content 270 can comprise the same content as the exemplary initial content 151, which was illustrated previously described in detail above, insofar as a user's consumption of such content is concerned. As indicated, however, the exemplary annotated content 270 can comprise annotations identifying multiple potential content interruption points, within the exemplary annotated content 270, where the presentation of the exemplary annotated content 270, such as is represented by the arrow 331, can be interrupted and auxiliary content can, instead, be presented to a user for a temporary period of time before presentation of the exemplary annotated content 270 resumes.

More specifically, presentation of the exemplary annotated content 270, as represented by the arrow 331, can proceed until one of the potential content interruption points, such as the exemplary potential content interruption point 311, is reached. According to one aspect, presentation of the exemplary annotated content 270 can comprise, at the point 311, a determination 341 as to whether the presentation of the exemplary annotated content 270 will be interrupted and one or more of the auxiliary content 261 will, instead, be temporarily presented to the user, prior to the recommencement of the presentation of the exemplary annotated content 270. The determination 341 can, according to one aspect, take into account various factors in determining whether to actually interrupt the presentation of the exemplary annotated content 270 at a potential content interruption point, such as the exemplary potential content interruption point 311. One such factor can be a duration of the presentation of the exemplary annotated content 270 since an immediately prior interruption of such presentation. For example, the determination 341 can choose not to interrupt the presentation of the exemplary annotated content 270 at the exemplary potential content interruption point 311 if the presentation of the exemplary annotated content 270 was last interrupted less than a threshold amount of time ago. As another example, the determination 341 can choose to interrupt the presentation of the exemplary annotated content 270 if the presentation of the exemplary annotated content 270 was last interrupted greater than some other threshold of time ago.

Another factor that can be considered in determining whether or not to interrupt presentation of content at a potential content interruption point can be based on a comparison of the content interruption point metadata with auxiliary content metadata. For example, the exemplary content interruption point 311 can be associated with content interruption point metadata 321 that can indicate that the exemplary content interruption point 311 was identified as a potential content interruption point due to a detected change in the people visible in the content at such a point. Utilizing such content interruption point metadata, the determination 341 can compare such content interruption point metadata to the auxiliary content metadata 162 to determine if any one or more of the auxiliary content 161 is to be presented during an interruption of the presentation of the exemplary annotated content 270 that is triggered by a detected change in the people visible in the exemplary annotated content 270 at such a point. Within the exemplary system 300 of FIG. 3, the determination 341 is illustrated as determining that the presentation of the exemplary annotated content 270 should continue and should not be interrupted at the exemplary potential content interruption point 311.

The presentation of the exemplary annotated content 270 can then continue after such a determination 341, as illustrated by the arrow 332, until a subsequent potential content interruption point, such as the exemplary potential content interruption 312, is reached. At such an exemplary potential content interruption point, another determination 342 can be made as to whether to interrupt the presentation of the exemplary annotated content 270 in order to insert auxiliary content at the exemplary potential content interruption point 312. As with the determination 341, the determination 342 can take into account various factors, such as those enumerated above. Within the exemplary system 300 of FIG. 3, the determination 342 is illustrated as determining that the presentation of the exemplary annotated content 270 should be interrupted at the exemplary potential content interruption point 312. Consequently, the presentation of the exemplary annotated content 270 can be temporarily interrupted and the user to whom the exemplary annotated content 270 was being presented can, instead, be presented with the auxiliary content 352. Upon completion of the presentation of the exemplary auxiliary content 352, presentation of the exemplary annotated content 270 can recommence from the point 312.

The presentation of the exemplary annotated content 270 can then continue after such a determination 342, as illustrated by the arrow 333, until a subsequent potential content interruption point, such as the exemplary potential content interruption point 313, is reached. At such an exemplary potential content interruption point, another determination 343 can be made as to whether to interrupt the presentation of the exemplary annotated content 270. As with the above determinations, the determination 343 can take into account various factors, including, for example, the comparison between the interruption point metadata 323 associated with the exemplary potential content interruption point 313 and one or more of the auxiliary content metadata 162. Within the exemplary system 300 of FIG. 3, the determination 343 is illustrated as determining that the presentation of the exemplary annotated content 270 should continue and should not be interrupted at the exemplary potential content interruption point 313.

As before, subsequent to the determination 343, presentation of the exemplary annotated content 270 can continue, as illustrated by the arrow 334, until a subsequent potential content interruption point, such as the exemplary potential content interruption 314, is reached. By way of an illustrative example, the determination 344 can select to interrupt the presentation of the exemplary annotated content 270, at the exemplary potential content interruption point 314, and, instead, temporarily present the auxiliary content 354 to the user. Continuing with the illustrative example, such a determination 344 can have been based on a comparison between the interruption point metadata 324, indicating that the exemplary potential content interruption point 314 was identified based on a detected change in the sound levels of the content, and the auxiliary content metadata 162 which can, for example, indicate that at least some of the auxiliary content 161, such as in the form of auxiliary content 354, can be presented in situations where a potential content interruption point was identified based on the detected change in sound levels. For example, within the specific context of advertising, advertisers can determine that transitions between exciting scenes and more calming scenes, such as could result in a detected change in the sound levels of the content, can cause people to desire to temporarily suspend their consumption of content and, instead, seek to obtain a snack or other like food items for themselves to consume upon resuming consumption of the content. Consequently, in such an example, food advertisers can include, with their advertisements, advertisement metadata that can indicate a desire to have such advertisements presented during potential content interruption points that were identified-based on detected changes in sound levels.

To complete the description of exemplary system 300 of FIG. 3, upon completion of the presentation of the auxiliary content 354, to a user, presentation of the exemplary annotated content 270 can resume from the point 314 at which it was interrupted, as illustrated by the arrow 335. A subsequent determination 345 can be made in conjunction with the presentation of the exemplary annotated content 270 reaching another potential content interruption point, such as the exemplary potential content interruption point 315. For purposes of illustration, the determination 345 can determine to, again, interrupt the presentation of the exemplary annotated content 270 and, instead, present the auxiliary content 355 to the user. Upon completion of the presentation of auxiliary content 355, to the user, the presentation of the exemplary annotated content 270 can recommence from the point 315, as illustrated by the arrow 336. The presentation of the exemplary annotated content 270 can then continue until a subsequent potential content interruption point, such as the exemplary potential content interruption 316, at which, as illustrated by the exemplary system 300 of FIG. 3, the determination 346 can determine not to interrupt presentation of the exemplary annotated content 270, at the exemplary potential content interruption point 316, and the presentation of the exemplary annotated content 270 can continue, as illustrated by the arrow 337.

Figure 4:
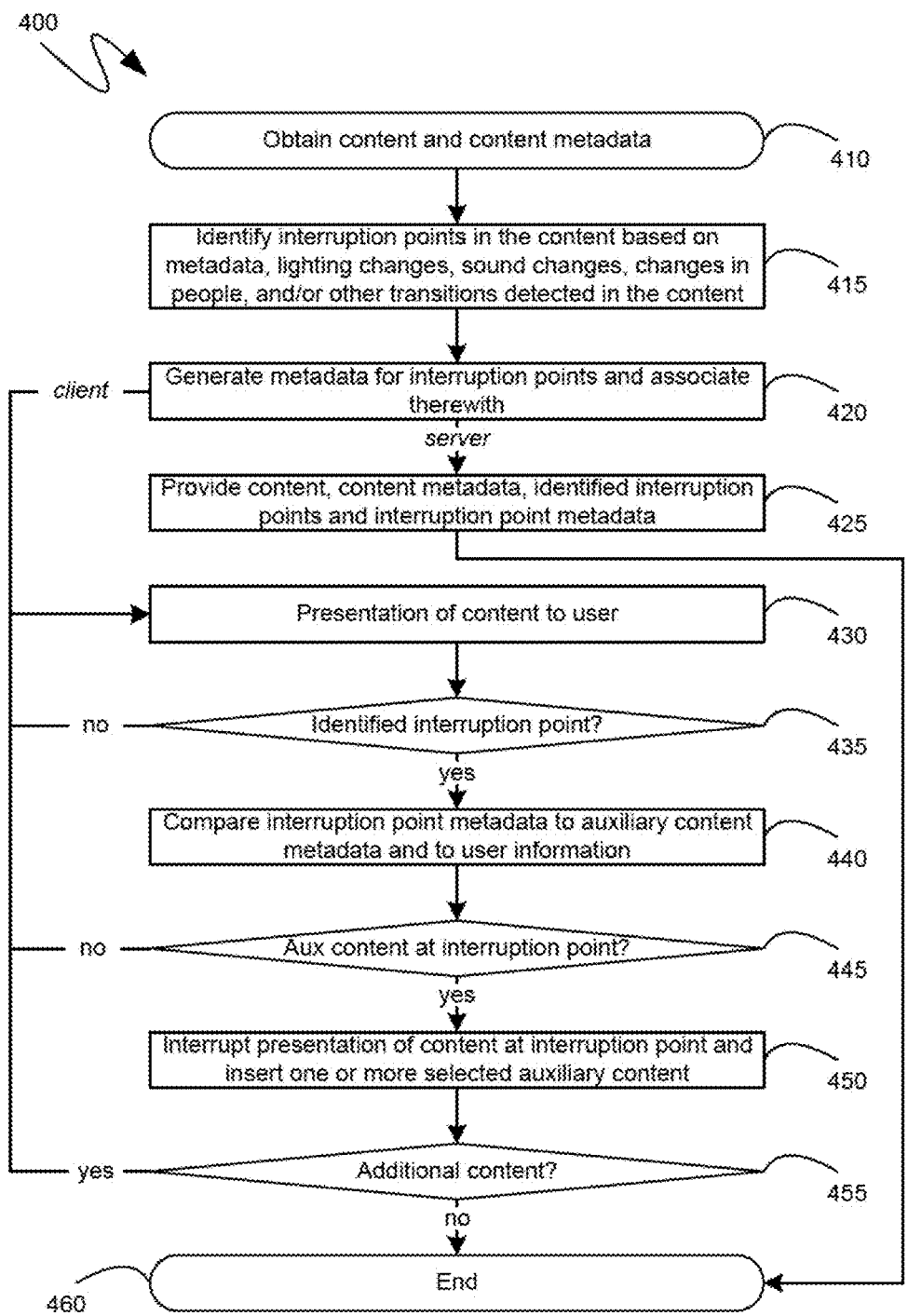
FIG. 4 is a flow diagram of an exemplary series of steps providing, and then utilizing, more accurate and efficient identification of potential interruption points in content.

Turning to FIG. 4, an exemplary flow diagram 400 is shown therein illustrating an exemplary series of steps by which potential content interruption points can be identified and subsequently evaluated in order to determine as to whether to actually interrupt the presentation of primary content, such as to temporarily display auxiliary content, prior to recommencing the presentation of the primary content. Initially, as represented by the step 410, content, and, optionally, content metadata can be obtained, where such content can be presented to, and consumed by, one or more users. The content, obtained at step 410, can include content that does not have any interruption points identified for such content, such as, for example, a movie or video game that was not previously presented in an interrupted fashion. According to another aspect, however, the content, obtained at step 410, can already comprise identified content interruption points, which, as indicated previously, can be indicated in the content itself, or in corresponding content metadata. For example, content, such as television shows, can comprise already identified content interruption points in the form of scene terminations that were explicitly filmed and edited in such a manner so as to provide explicit content interruption points. Such content, having already identified content interruption points, can still benefit from the processes of the exemplary flow diagram 400, since such processes, as already described, and as will be described further below, can identify still further content interruption points, which can enable the content to be presented in a more tailored manner, thereby making the distribution of such content to a greater breadth of user more efficient and thereby increasing user enjoyment and user engagement and increasing user interaction performance with the content.

Subsequent to step 410, at step 415, potential interruption points in the content obtained at step 410 can be identified. As detailed above, the identification of potential interruption points, at step 415, can be based on a variety of factors including, for example, explicitly identified interruption points or other transitions in the content metadata that was received at step 410, changes in the sound of the content, changes in the lighting of the content, changes in the people detected in the content, other transitions within the context of the content, or combinations thereof.

In connection with the identification of potential content interruption points, at step 415, content point metadata can be generated, at step 420, and associated therewith. As indicated previously, such content point metadata can indicate the detected transition, or other like triggering event, causing a point within the content, obtained at step 410, to be identified as a potential content interruption point. Steps 415 and 420 can, according to one aspect, be performed prior to the presentation of the content, obtained at step 410, to a user. In an alternative aspect, steps 415 and 420 can be performed as the content is being presented to a user.

As illustrated in FIG. 4, steps 415 and 420 can be performed on a content presentation device, such as prior to the presentation of contents to a user, they can be performed on one or more server computing devices prior to the delivery of content to a content presentation device, or they can be performed on combinations thereof. Should steps 415 and 420 have been performed on the server, processing can proceed with step 425, where an annotated version of the content, comprising the identified potential interruption points, which were identified in step 415, and, optionally, comprising interruption point metadata, such as was generated at step 420, can be communicated to a content presentation device. As will be recognized by those skilled in the art, the information illustrated as being communicated, by step 425, can be communicated in a single file or data structure, multiple files or data structures, as a stream, or combinations thereof. Once the annotated content was provided to the content presentation device, such as at step 425, the relevant processing can end, such as at step 460.

If steps 415 and 420 were performed on a content presentation device, then rather than proceeding with step 425, processing can proceed to step 430, at which point presentation of the annotated content to a user, by the content presentation device, and via a physical display device communicationally coupled to such a content presentation device, can commence. As part of the presentation of the annotated content, annotated by the steps 415 and 420, one of the identified potential content interruption points can be reached, such as at step 435. More specifically, the presentation of the content to the user, at step 430, can continue until a potential content interruption point is reached, as determined at step 435. Once such a potential content interruption point is reached in the presentation of the content to the user, processing can proceed to step 440 where interruption point metadata associated with the potential content interruption point, which was reached at step 435, can be compared to auxiliary content metadata and/or user information in order to determine whether to interrupt the presentation of the content, at the potential content interruption point, and, instead, present auxiliary content.

If, at step 445, a determination is made that the presentation of the content to the user should proceed through the potential content interruption point, and that such presentation should not be interrupted, then processing can return to step 430. Conversely, if, at step 445, a determination is made that the presentation of the primary content to the user should be interrupted at the potential content interruption point, then processing can proceed to step 450, where one or more auxiliary content will be presented to the user instead of the primary content that was interrupted. Upon completion of the presentation, to the user, of the auxiliary content, at step 450, a subsequent determination can be made as to whether additional primary content remains beyond the content interruption point. If, at step 455, it is determined that no further primary content remains beyond the content interruption point, then, with the completion of the presentation of auxiliary content to the user, at step 450, the relevant processing can end at set 460. Conversely, if, at step 455 it is determined that additional primary content remains beyond the constant interruption point, processing can return to step 430, and the presentation of the primary content to proceed from the interruption point at which it was interrupted to present the auxiliary content, at step 450.

Figure 5:
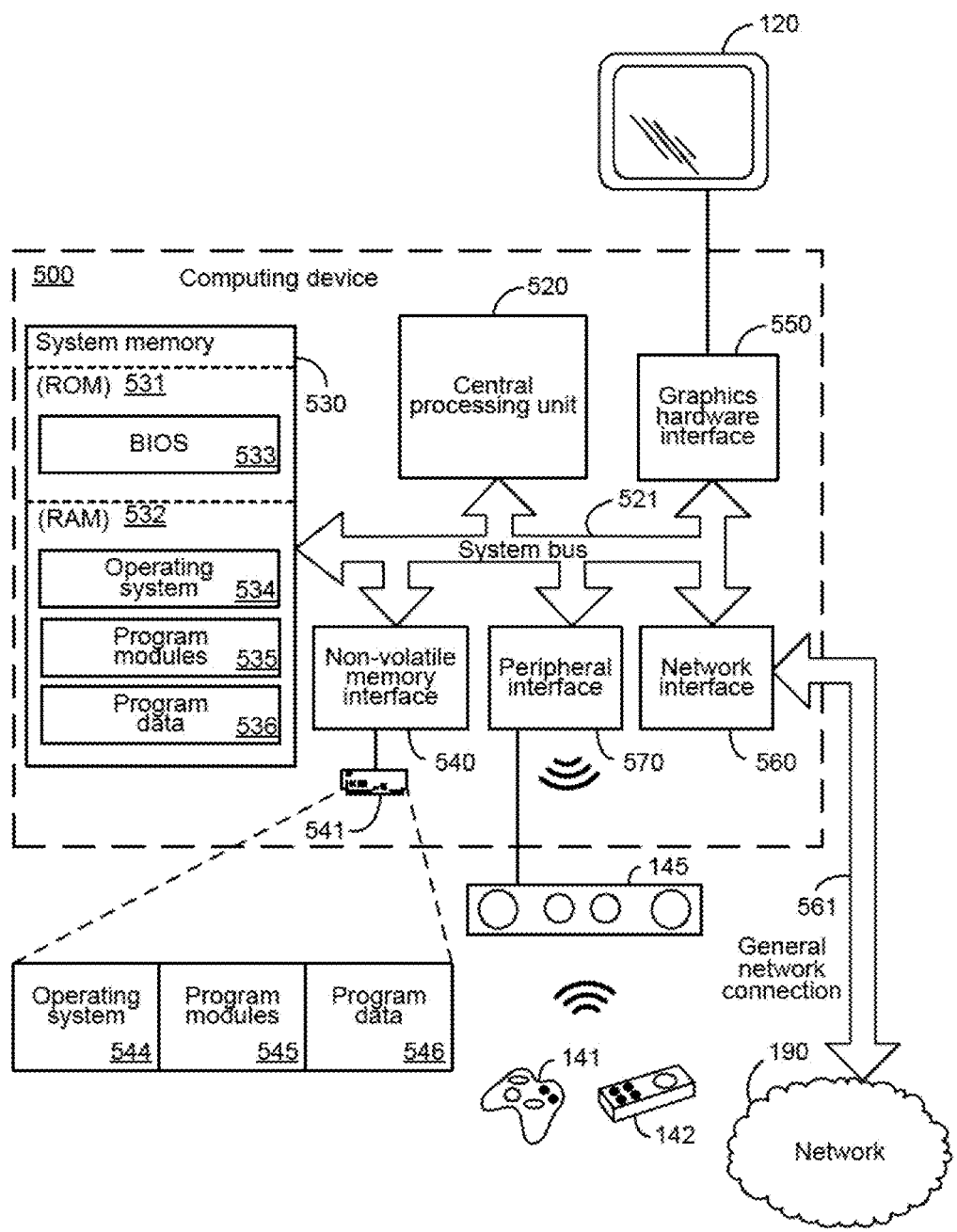
FIG. 5 is a block diagram of an exemplary content presentation device.

Turning to FIG. 5, an exemplary content presentation device 500 is illustrated which can perform some or all of the mechanisms and actions described above. The exemplary content presentation device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The content presentation device 500 can include graphics hardware, including, but not limited to, a graphics hardware interface 550 and the display device 120, described previously. Depending on the specific physical implementation, one or more of the CPUs 520, the system memory 530 and other components of the content presentation device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The content presentation device 500 also typically includes computer readable media, which can include any available media that can be accessed by content presentation device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the content presentation device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within content presentation device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The content presentation device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary content presentation device include, but are not limited to, magnetic tape cassettes, flash memory cards, digital versatile disks, digital video tape, solid state RAM, solid state ROM, and the like. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the content presentation device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The content presentation device 500 may operate in a networked environment using logical connections to one or more remote computers. The content presentation device 500 is illustrated as being connected to the general network connection 561 through a network interface or adapter 560, which is, in turn, connected to the system bus 521. In a networked environment, program modules depicted relative to the content presentation device 500, or portions or peripherals thereof, may be stored in the memory of one or more computing devices that are communicatively coupled to the content presentation device 500 through the general network connection 561. For example, at least some of the program modules 545 and program data 546 can be stored on computer-readable storage media remote from the content presentation device 500 and accessible by the content presentation device 500 over the network 190 via the general network connection 561 shown in FIG. 5. In such an instance, the relevant portions of the program modules 545 and/or program data 546 can be streamed or otherwise communicated in real-time or in pseudo-real-time to the content presentation device 500 to be executed and/or utilized thereby in the same manner as if such program modules 545 and/or program data 546 were stored on a local storage device of the content presentation device 500, such as, for example, the hard disk drive 541. It will be appreciated that the network connections shown are exemplary and other means of establishing a communications link between computing devices may be used.

Additionally, the content presentation device 500 can also include, or communicate with, user interface and input peripherals, including, but not limited to the game controller 141, the remote control 142 and the audio/video input device 145 that were described previously with reference to FIG. 1. Other types of input peripherals can equally be utilized, including more traditional computing device input peripherals, such as a keyboard, a trackpad, or a mouse. The display 120 can, itself, be an input peripheral capable of receiving touch-based user input, such as a touch-sensitive, or multi-touch capable, display device. Such input peripherals can be communicationally coupled to the system bus 121 via a peripheral interface 570. Such communicational couplings can be wired, as exemplarily illustrated in FIG. 5 with the wired connection between the peripheral interface 570 and the audio/video input device 145, or they can be wireless, as exemplarily illustrated in FIG. 5 with the wireless connection between the peripheral interface 570 and the game controller 141 and the remote control 142.

Although described as a single physical device, the exemplary content presentation device 500 can be a virtual content presentation device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary content presentation device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "content presentation device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a content interruption point identification device providing improved accuracy and efficiency in identifying interruption points in content, the content interruption point identification device comprising: one or more processing units that execute computer-executable instructions; and a content interruption point identification engine comprising computer-executable instructions which, when executed by at least some of the one or more processing units, cause the content interruption point identification device to perform steps comprising: identifying scene changes in the content based on at least one of: a detected change in brightness of the content, a detected change in audio volume of the content, or a detected change in a quantity of people visible in the content; selecting at least some of the identified scene changes to be identified as potential content interruption points at which presentation of the content to a user is temporarily interruptible to accommodate presentation of auxiliary content to the user; and annotating the content to comprise the selected ones of the identified potential content interruption points.

A second example is the content interruption point identification device of the first example, wherein the content interruption point identification engine comprises further computer-executable instructions which, when executed by at least some of the one or more processing units, cause the content interruption point identification device to perform steps comprising: generating content interruption point metadata for the selected ones of the identified potential content interruption points, each of the generated content interruption point metadata indicating why a corresponding one of the identified potential content interruption points was identified.

A third example is the content interruption point identification device of the first example, wherein the content interruption point identification engine comprises further computer-executable instructions which, when executed by at least some of the one or more processing units, cause the content interruption point identification device to perform steps comprising: identifying further potential content interruption points from portions of the content identified by content metadata associated with the content.

A fourth example is the content interruption point identification device of the first example, wherein the computer-executable instructions that cause the content interruption point identification device to identify scene changes in the content based on the detected change in the brightness of the content, the computer-executable instructions that cause the content interruption point identification device to identify scene changes in the content based on the detected change in audio volume of the content, and the computer-executable instructions that cause the content interruption point identification device to identify scene changes in the content based on the detected change in a quantity of people visible in the content are each executed independently of one another; and wherein further the content interruption point identification engine comprises further computer-executable instructions which, when executed by at least some of the one or more processing units, cause the content interruption point identification device to perform steps comprising: aggregating together the identified potential content interruption points selected from scene changes identified based on the detected change in the brightness of the content, the identified potential content interruption points selected from scene changes in the content based on the detected change in audio volume of the content and the identified potential content interruption points selected from scene changes in the content based on the detected change in a quantity of people visible in the content.

A fifth example is the content interruption point identification device of the fourth example, wherein the computer-executable instructions causing the content interruption point identification device to perform the aggregation comprise computer-executable instructions which, when executed by at least some of the one or more processing units, cause the content interruption point identification device to perform steps comprising: identifying at least two separately identified content interruption points from a same scene change; combining the identified at least two separately identified content interruption points into a single content interruption point; and combining content interruption point metadata associated with each of the identified at least two separately identified content interruption points into a single content interruption point metadata associated with the single content interruption point.

A sixth example is the content interruption point identification device of the first example, wherein the content interruption point identification engine comprises further computer-executable instructions which, when executed by at least some of the one or more processing units, cause the content interruption point identification device to perform steps comprising: transmitting the annotated content to a content presentation device that is communicationally coupled to a physical display device on which the content will be presented to the user.

A seventh example is the content interruption point identification device of the first example, further comprising additional computer-executable instructions which, when executed by at least some of the one or more processing units, cause the content interruption point identification device to perform steps comprising: presenting the content to the user on a physical display device communicationally coupled to the content interruption point identification device; reaching, as part of the presenting the content, a one of the identified potential content interruption points; determining whether to interrupt the presenting the content at the reached identified potential content interruption point; and temporarily interrupting the presenting the content at the reached identified potential content interruption point and, instead, temporarily presenting auxiliary content, if the determining determines to interrupt the presenting the content.

An eighth example is the content interruption point identification device of the seventh example, wherein the determining is based on the comparison of a content interruption point metadata associated with the reached identified potential content interruption point with auxiliary content metadata associated with the temporarily presented auxiliary content.

A ninth example is the content interruption point identification device of the seventh example, wherein the determining is based on an elapsed time since the presenting the content was temporarily interrupted.

A tenth example is a method for improving accuracy and efficiency in identifying interruption points in content, the method comprising the steps of: identifying scene changes in the content based on at least one of: a detected change in brightness of the content, a detected change in audio volume of the content, or a detected change in a quantity of people visible in the content; selecting at least some of the identified scene changes to be identified as potential content interruption points at which presentation of the content to a user is temporarily interruptible to accommodate presentation of auxiliary content to the user; and annotating the content to comprise the selected ones of the identified potential content interruption points.

An eleventh example is the method of the tenth example, further comprising the steps of: generating content interruption point metadata for the selected ones of the identified potential content interruption points, each of the generated content interruption point metadata indicating why a corresponding one of the identified potential content interruption points was identified.

A twelfth example is the method of the tenth example, wherein the identifying the scene changes based on the detected change in the brightness of the content, the identifying the scene changes based on the detected change in the audio volume of the content, and the identifying the scene changes based on the detected change in a quantity of people visible in the content are performed independently of one another; the method further comprising the steps of: aggregating together the identified potential content interruption points selected from scene changes identified based on the detected change in the brightness of the content, the identified potential content interruption points selected from scene changes in the content based on the detected change in audio volume of the content and the identified potential content interruption points selected from scene changes in the content based on the detected change in a quantity of people visible in the content.

A thirteenth example is the method of the twelfth example, further comprising the steps of: identifying at least two separately identified content interruption points from a same scene change; combining the identified at least two separately identified content interruption points into a single content interruption point; and combining content interruption point metadata associated with each of the identified at least two separately identified content interruption points into a single content interruption point metadata associated with the single content interruption point.

A fourteenth example is the method of the tenth example, further comprising the steps of: transmitting the annotated content to a content presentation device that is communicationally coupled to a physical display device on which the content will be presented to the user.

A fifteenth example is the method of the tenth example, further comprising the steps of: presenting the content to the user on a physical display device; reaching, as part of the presenting the content, a one of the identified potential content interruption points; determining whether to interrupt the presenting the content at the reached identified potential content interruption point; and temporarily interrupting the presenting the content at the reached identified potential content interruption point and, instead, temporarily presenting auxiliary content, if the determining determines to interrupt the presenting the content.

A sixteenth example is method of the fifteenth example, wherein the determining is based on the comparison of a content interruption point metadata associated with the reached identified potential content interruption point with auxiliary content metadata associated with the temporarily presented auxiliary content.

A seventeenth example is a system comprising: a content presentation device configured to perform steps comprising: presenting content to a user on a physical display device communicationally coupled to the content presentation device; reaching, as part of the presenting the content, an identified potential content interruption point; determining whether to interrupt the presenting the content at the reached identified potential content interruption point; and temporarily interrupting the presenting the content at the reached identified potential content interruption point and, instead, temporarily presenting auxiliary content, if the determining determines to interrupt the presenting the content; and one or more computer-readable storage media comprising computer-executable instructions directed to steps comprising: identifying scene changes in the content based on at least one of: a detected change in brightness of the content, a detected change in audio volume of the content, or a detected change in a quantity of people visible in the content; selecting at least some of the identified scene changes to be identified as potential content interruption points; and annotating the content to comprise the selected ones of the identified potential content interruption points.

An eighteenth example is the system of the seventeenth example, further comprising a content service computing device, separate and apart from the content presentation device, the content service computing device comprising the one or more computer-readable storage media.

A nineteenth example is the system of the seventeenth example, wherein the content presentation device comprises the one or more computer-readable storage media; and wherein further the computer-executable instructions directed to identifying scene changes in the content based on the detected change in the brightness of the content, the computer-executable instructions directed to identifying scene changes in the content based on the detected change in audio volume of the content, and the computer-executable instructions directed to identifying scene changes in the content based on the detected change in a quantity of people visible in the content are each executed independently of one another; and wherein still further the one or more computer-readable storage media comprise further computer-executable instructions directed to: aggregating together the identified potential content interruption points selected from scene changes identified based on the detected change in the brightness of the content, the identified potential content interruption points selected from scene changes in the content based on the detected change in audio volume of the content and the identified potential content interruption points selected from scene changes in the content based on the detected change in a quantity of people visible in the content.

A twentieth example is the system of the seventeenth example, wherein the determining is based on the comparison of a content interruption point metadata associated with the reached identified potential content interruption point with auxiliary content metadata associated with the temporarily presented auxiliary content.

As can be seen from the above descriptions, mechanisms for improving accuracy and efficiency in identifying interruption points in content have been presented. In view of the many possible variations of the subject matter described herein, we claim as our invention all such embodiments as may come within the scope of the following claims and equivalents thereto.

We claim:

1. A computing device providing improved accuracy and efficiency in identifying interruption points in content, the computing device comprising:
   one or more processing units that execute computer-executable instructions; and
   one or more computer-readable media comprising computer-executable instructions which, when executed by at least some of the one or more processing units, cause the computing device to perform steps comprising:
   identifying scene changes in the content based on at least one of: a detected change in brightness of the content, a detected change in audio volume of the content, or a detected change in a quantity of people visible in the content;
   selecting at least some of the identified scene changes to be identified as potential content interruption points at which presentation of the content to a user is temporarily interruptible to accommodate presentation of auxiliary content to the user;
   annotating the content to comprise the selected ones of the identified potential content interruption points;
   presenting the content to the user on a physical display device communicationally coupled to the content interruption point identification device;
   reaching, as part of the presenting the content, a one of the identified potential content interruption points;
   determining whether to interrupt the presenting the content at the reached identified potential content interruption point, the determining being based at least in part on an elapsed time since the presenting the content was temporarily interrupted; and
   temporarily interrupting the presenting the content at the reached identified potential content interruption point and, instead, temporarily presenting auxiliary content, if the determining determines to interrupt the presenting the content.

2. The computing device of claim 1, wherein the computer-readable media comprises further computer-executable instructions which, when executed by at least some of the one or more processing units, cause the computing device to perform steps comprising: generating content interruption point metadata for the selected ones of the identified potential content interruption points, each of the generated content interruption point metadata indicating why a corresponding one of the identified potential content interruption points was identified.

3. The computing device of claim 1, wherein the computer-readable media comprises further computer-executable instructions which, when executed by at least some of the one or more processing units, cause the computing device to perform steps comprising: identifying further potential content interruption points from portions of the content identified by content metadata associated with the content.

4. The computing device of claim 1, wherein the computer-executable instructions that cause the computing device to identify scene changes in the content based on the detected change in the brightness of the content, the computer-executable instructions that cause the computing device to identify scene changes in the content based on the detected change in audio volume of the content, and the computer-executable instructions that cause the computing device to identify scene changes in the content based on the detected change in a quantity of people visible in the content are each executed independently of one another; and wherein further the computer-readable media comprises further computer-executable instructions which, when executed by at least some of the one or more processing units, cause the computing device to perform steps comprising: aggregating together the identified potential content interruption points selected from scene changes identified based on the detected change in the brightness of the content, the identified potential content interruption points selected from scene changes in the content based on the detected change in audio volume of the content and the identified potential content interruption points selected from scene changes in the content based on the detected change in a quantity of people visible in the content.

5. The computing device of claim 4, wherein the computer-executable instructions causing the computing device to perform the aggregation comprise computer-executable instructions which, when executed by at least some of the one or more processing units, cause the computing device to perform steps comprising:
identifying at least two separately identified content interruption points from a same scene change;
combining the identified at least two separately identified content interruption points into a single content interruption point; and
combining content interruption point metadata associated with each of the identified at least two separately identified content interruption points into a single content interruption point metadata associated with the single content interruption point.

6. The computing device of claim 1, wherein the determining is further based on the comparison of a content interruption point metadata associated with the reached identified potential content interruption point with auxiliary content metadata associated with the temporarily presented auxiliary content.

7. A method for improving accuracy and efficiency in identifying interruption points in content, the method comprising the steps of:
identifying scene changes in the content based on at least one of: a detected change in brightness of the content, a detected change in audio volume of the content, or a detected change in a quantity of people visible in the content;
selecting at least some of the identified scene changes to be identified as potential content interruption points at which presentation of the content to a user is temporarily interruptible to accommodate presentation of auxiliary content to the user;
annotating the content to comprise the selected ones of the identified potential content interruption points;
presenting the content to the user on a physical display device;
reaching, as part of the presenting the content, a one of the identified potential content interruption points;
determining whether to interrupt the presenting the content at the reached identified potential content interruption point, the determining being based at least in part on an elapsed time since the presenting the content was temporarily interrupted; and
temporarily interrupting the presenting the content at the reached identified potential content interruption point and, instead, temporarily presenting auxiliary content, if the determining determines to interrupt the presenting the content.

8. The method of claim 7, further comprising the steps of: generating content interruption point metadata for the selected ones of the identified potential content interruption points, each of the generated content interruption point metadata indicating why a corresponding one of the identified potential content interruption points was identified.

9. The method of claim 7, wherein the identifying the scene changes based on the detected change in the brightness of the content, the identifying the scene changes based on the detected change in the audio volume of the content, and the identifying the scene changes based on the detected change in a quantity of people visible in the content are performed independently of one another; the method further comprising the steps of: aggregating together the identified potential content interruption points selected from scene changes identified based on the detected change in the brightness of the content, the identified potential content interruption points selected from scene changes in the content based on the detected change in audio volume of the content and the identified potential content interruption points selected from scene changes in the content based on the detected change in a quantity of people visible in the content.

10. The method of claim 9, further comprising the steps of:
identifying at least two separately identified content interruption points from a same scene change;
combining the identified at least two separately identified content interruption points into a single content interruption point; and
combining content interruption point metadata associated with each of the identified at least two separately identified content interruption points into a single content interruption point metadata associated with the single content interruption point.

11. The method of claim 7, further comprising the steps of: transmitting the annotated content to a content presentation device that is communicationally coupled to the physical display device on which the content will be presented to the user, wherein the identifying, the selecting and the annotating are performed by a content service computing device that is separate from, and independent of, the content presentation device.

12. The method of claim 7, wherein the determining is further based on the comparison of a content interruption point metadata associated with the reached identified potential content interruption point with auxiliary content metadata associated with the temporarily presented auxiliary content.

13. A system comprising:
a content presentation device configured to perform steps comprising:
presenting content to a user on a physical display device communicationally coupled to the content presentation device;
reaching, as part of the presenting the content, an identified potential content interruption point;
determining whether to interrupt the presenting the content at the reached identified potential content interruption point, the determining being based at least in part on an elapsed time since the presenting the content was temporarily interrupted; and
temporarily interrupting the presenting the content at the reached identified potential content interruption point and, instead, temporarily presenting auxiliary content, if the determining determines to interrupt the presenting the content; and
one or more computer-readable storage media comprising computer-executable instructions directed to steps comprising:
identifying scene changes in the content based on at least one of: a detected change in brightness of the content, a detected change in audio volume of the content, or a detected change in a quantity of people visible in the content;
selecting at least some of the identified scene changes to be identified as potential content interruption points; and
annotating the content to comprise the selected ones of the identified potential content interruption points.

14. The system of claim 13, further comprising a content service computing device, separate and apart from the content presentation device, the content service computing device comprising the one or more computer-readable storage media.

15. The system of claim 13, wherein the content presentation device comprises the one or more computer-readable storage media; and wherein further the computer-executable instructions directed to identifying scene changes in the content based on the detected change in the brightness of the content, the computer-executable instructions directed to identifying scene changes in the content based on the detected change in audio volume of the content, and the computer-executable instructions directed to identifying scene changes in the content based on the detected change in a quantity of people visible in the content are each executed independently of one another; and wherein still further the one or more computer-readable storage media comprise further computer-executable instructions directed to: aggregating together the identified potential content interruption points selected from scene changes identified based on the detected change in the brightness of the content, the identified potential content interruption points selected from scene changes in the content based on the detected change in audio volume of the content and the identified potential content interruption points selected from scene changes in the content based on the detected change in a quantity of people visible in the content.

16. The system of claim 13, wherein the determining is further based on the comparison of a content interruption point metadata associated with the reached identified potential content interruption point with auxiliary content metadata associated with the temporarily presented auxiliary content.

17. The method of claim 7, further comprising the steps of: identifying further potential content interruption points from portions of the content identified by content metadata associated with the content.

18. The system of claim 15, wherein the computer-executable instructions directed to the aggregating comprise computer-executable instructions directed to:
identifying at least two separately identified content interruption points from a same scene change;
combining the identified at least two separately identified content interruption points into a single content interruption point; and
combining content interruption point metadata associated with each of the identified at least two separately identified content interruption points into a single content interruption point metadata associated with the single content interruption point.

19. The system of claim 13, wherein the computer-readable storage media comprise further computer-executable instructions directed to: generating content interruption point metadata for the selected ones of the identified potential content interruption points, each of the generated content interruption point metadata indicating why a corresponding one of the identified potential content interruption points was identified.

20. The system of claim 13, wherein the computer-readable storage media comprise further computer-executable instructions directed to: identifying further potential content interruption points from portions of the content identified by content metadata associated with the content.

* * * * *